United States Patent [19]

Fujikawa et al.

[11] Patent Number: 5,404,075
[45] Date of Patent: * Apr. 4, 1995

[54] TFEL ELEMENT WITH TANTALUM OXIDE AND TUNGSTEN OXIDE INSULATING LAYER

[75] Inventors: Hisayoshi Fujikawa, Aichi; Yasunori Taga, Nagoya, both of Japan

[73] Assignees: Kabushiki Kaisha Toyota Chuo Kenkyusho, Aichi; Nippondenso Co., Ltd., Kariya, both of Japan

[*] Notice: The portion of the term of this patent subsequent to Jul. 6, 2010 has been disclaimed.

[21] Appl. No.: 964,965

[22] Filed: Oct. 22, 1992

[30] Foreign Application Priority Data

Dec. 26, 1991 [JP] Japan .................. 3-344758

[51] Int. Cl.⁶ .............................................. H01J 1/70
[52] U.S. Cl. .................... 313/509; 313/503; 313/506
[58] Field of Search ............ 313/502, 503, 506, 507, 313/509; 428/426; 156/252; 252/63.2

[56] References Cited

U.S. PATENT DOCUMENTS

| | | | |
|---|---|---|---|
| 4,054,531 | 10/1977 | Takahashi | 252/63.2 |
| 4,392,907 | 7/1983 | Shirato et al. | 156/252 |
| 4,670,355 | 6/1987 | Matsudaira | 313/503 |
| 4,727,004 | 2/1988 | Tanaka et al. | 313/503 |
| 4,733,128 | 3/1988 | Tohda et al. | 313/503 |
| 5,037,709 | 8/1991 | Tomomura et al. | 313/509 |
| 5,099,172 | 3/1992 | Taguchi et al. | 313/502 |
| 5,161,233 | 11/1992 | Matsuo et al. | 355/218 |
| 5,225,286 | 7/1993 | Fujikawa | 428/426 |

FOREIGN PATENT DOCUMENTS 50-27488 3/1975 Japan.
58-216391 12/1983 Japan.
64-54692 3/1989 Japan.

*Primary Examiner*—Anita Pellman Gross
*Assistant Examiner*—Walter Malinowski
*Attorney, Agent, or Firm*—Oblon, Spivak, McClelland, Maier & Neustadt

[57] ABSTRACT

A thin film EL element includes a pair of electrodes disposed oppositely each other, a pair of insulator layers disposed between the electrodes, at least one of the insulator layers consisting essentially of tantalum oxide ($Ta_2O_5$) and at least one oxide selected from the group consisting of yttrium oxide ($Y_2O_3$) and tungsten oxide ($WO_3$), and a luminous layer held between the insulator layers. The EL element can be operated at high luminance with only a minimum low voltage required for such an operation. Further, the EL element makes long-lived, stable, etc. display devices. Furthermore, the EL element can be produced by a simplified manufacturing process.

8 Claims, 7 Drawing Sheets

TFEL ELEMENT WITH TANTALUM OXIDE AND TUNGSTEN OXIDE INSULATING LAYER

BACKGROUND OF THE INVENTION

1. Field of the Invention

The present invention relates to a thin film electroluminescent (hereinafter abbreviated to "EL") element which is used in display devices, etc.

2. Description of the Related Art

It is indispensable to employ a display device as an interface between men and machines. For instance, in display devices of OA (i.e., office automation) equipment adapted for office work, computation, etc., a CRT (i.e., cathode ray tube) has been widely used because it allows high resolving power and good visibility, and because it displays full color with ease. However, the CRT suffers from the following drawback: since it is necessary to provide the CRT with a large depth, the CRT inevitably comes to occupy a large space.

On the other hand, there have been increasing demands for lap-top type personal computers. Accordingly, display devices are being reduced in size and weight, and even full-colored liquid crystals have come to be used. However, in the case of liquid crystal display devices, there are drawbacks as follows: since the liquid crystals themselves are non-luminous, it is necessary to provide the liquid crystal display devices with back lighting. Since liquid crystal display devices utilize the polarization of the liquid crystals, their visual field becomes smaller and they respond to commands slowly.

As display devices other than the CRT, the following display devices are used: plasma display devices, fluorescent display tubes, display tubes in which light-emitting diodes, are disposed in an array. However, these display devices have drawbacks in that they cannot be made to display full color because it is hard to produce all of the three primary colors of light, e.g., red, green and blue, with them. Further, the display dots of these display devices cannot be made smaller in view of their resolving power.

Under the aforementioned circumstances, EL elements has come to draw electronics engineers' attention: an EL element is a whole solid thin film which is self-luminous. The EL element has been put into practical application as a flat panel display device. This thin film EL element is of a whole solid type, and it has a construction in which a luminous layer is held between insulator layers.

When the EL element is combined with a transparent electrode, the EL element can be formed on an inexpensive glass substrate, and it enables surface luminescence over a large area. Further, when both of the electrodes on the top and bottom of the luminous layer are transparent electrodes, the EL element can be converted into a transparent type element. Furthermore, when photolithography is used to form the EL element, an extremely tiny EL element can be formed, and, accordingly, its resolving power can be increased.

In particular, a transparent element including a pair of transparent electrodes can be employed as an automobile indicator. If such is the case, the EL element enables the construction of a head up display device. The head up display device allows a driver to recognize the view field in front of him when the transparent element does not emit light, and it also allows him to recognize both the view field as well as the displayed information at the same time when the transparent element emits lights. Hence, the development of the head up display device is now under way.

Moreover, it is necessary to apply an alternating-current (hereinafter abbreviated to "AC") voltage of approximately 100 to 200 V in order to operate the EL element. Here, in the EL element, the luminous layer is held between insulator layers like a sandwich, and accordingly, electric current is regulated by them. As a result, the EL element consumes an extremely small amount of electric power.

In addition, the thin film EL element is self-luminous unlike conventional elements, and accordingly it is also of superior visibility. Hence, the thin film EL element is more appropriate for automobile display devices than conventional elements are.

However, there are the following problems with thin film EL elements at present. Namely, an AC electric field of an extremely high intensity should be applied to the thin film EL element according to the operational principle of the element. Therefore, in the construction of the element, the insulator layers hold the luminous layer like a sandwich, and they regulate the flow of electric current. Accordingly, the dielectric breakdown of the insulator layers is one factor which determines the life of the element. In addition, when the element is mounted on an automobile, it is used in a severe environment, for instance, in a high temperature and high humidity environment, which differs remarkably from current applications in general offices. In such an environment the insulator layers degrade rapidly. For an element having a large area, even when one of the pixels breaks down, the element hardly performs its functions properly. Hence, a system which enables the formation of insulator layers having high insulation properties over large areas uniformly becomes important. Also, the film forming technique used for forming the insulator layers is one of the key factors in improving the life of the element and the reliability thereof as well as in improving the yield loss in the production process of the element.

Generally speaking, a thin film EL element comprises a luminous layer including a semiconductor, which contains a compound including at least a combination of a group II element and a group VI element of the Periodic Table, such as ZnS, CaS, SrS, or the like as a base material to which a rare earth element is added, insulator layers holding the luminous layer like a sandwich therebetween, and transparent electrodes or metallic electrodes disposed on both surfaces of the insulator layers. When an AC voltage is applied between the electrodes, luminous centers of the luminous layers are excited, and consequently the electroluminescense is carried out.

A high electric field of approximately 1 to 2 MV/cm is applied to the luminous layer. Accordingly, the electric current must be regulated by the insulator layers in order to carry out the electroluminescense operation stably. Therefore, the uniformity and the stability of the insulator layers are some of the most important factors for stabilizing the operations of EL elements and making an EL element highly functional. In addition, the EL element is operated with an AC voltage, the insulator layers work in a manner identical with capacitor films, and accordingly it is necessary to employ insulator layers having high dielectric constants so as to reduce the operating voltage of the EL element.

Moreover, the light-emitting luminance of the EL element is in proportion to the electric current which flows in the luminous layer, and this electric current depends on the charges which accumulate in the boundary surfaces between the insulator layers and the luminous layer. These charges in turn depend upon the maximum accumulable charges of the insulator layers. That is, they depend on the figures of merit of the insulator layers; i.e., the product of the dielectric breakdown fields and the dielectric constants thereof. Hence, it is important to employ a material exhibiting a large maximum accumulable charge in order to make the luminance of the EL element high. Additionally, the EL element does not need to be a propagation type, but it does need to be a self-healing type in the adhesion mode, the dielectric breakdown mode, etc., in the boundary surfaces between the luminous layer and the insulator layers or the boundary surfaces between the insulator layers and the electrodes. If such is the case, even when there arises a dielectric breakdown at a certain portion of the EL element display device, the dielectric breakdown does not propagate over the entire display device, and the other portions thereof which are properly functioning can be in charge of the operation.

SUMMARY OF THE INVENTION

The present invention has been developed in view of the above-described circumstances. It is therefore an object of the present invention to provide a thin film EL element which exhibits high insulation properties and which is improved and stabilized in terms of display durability.

A thin film EL element according to the present invention comprises:
 a pair of electrodes disposed opposite to each other;
 a pair of insulator layers disposed between the electrodes, at least one of the insulator layers consisting essentially of tantalum oxide ($Ta_2O_5$) and at least one oxide selected from the group consisting of yttrium oxide ($Y_2O_3$) and tungsten oxide ($WO_3$); and
 a luminous layer held between the insulator layers.

The present thin film EL element comprises a luminous layer which contains a compound including at least a combination of a group II element and a group VI element of the Periodic Table with the rare earth element added as luminous centers, insulator layers which are disposed on both surfaces of the luminous layer, which hold the luminous layer, at least one of which includes the composite oxide insulator film consisting essentially of $Ta_2O_5$ and at least one of the abovementioned oxides, and a pair of the electrodes which are disposed on the outer surfaces of the insulator layers.

Although a simple $Ta_2O_5$ insulator film can constitute an insulator layer which exhibits a high dielectric constant, its insulation property is further improved by adding the following oxides into the $Ta_2O_5$ insulator film. Namely, either one of $Y_2O_3$ and $WO_3$, or both of them can be added thereinto. There are preferred ranges. For instance, it is preferable to add $Y_2O_3$ into the simple $Ta_2O_5$ insulator film so that the yttrium amount is from 8 to 30 atomic % with respect to the sum of tantalum and yttrium taken as 100 atomic %. Further, it is preferable to add $WO_3$ into the simple $Ta_2O_5$ insulator film so that the tungsten amount is less than 15 atomic % with respect to the sum of tantalum and tungsten taken as 100 atomic %. It is further preferable to add $WO_3$ into the simple $Ta_2O_5$ insulator film so that the tungsten amount is less than 15 atomic % with respect to the sum of tantalum and tungsten taken as 100 atomic %. It is further preferable to add $WO_3$ into the simple $Ta_2O_5$ insulator film so that the tungsten amount is 2 to 4 atomic % with respect to the sum of tantalum and tungsten taken as 100 atomic %.

When $Y_2O_3$ is added into the simple $Ta_2O_5$ insulator film, the insulating property of the composite oxide insulator film is improved over a wide range of yttrium. However, when $Y_2O_5$ is added thereinto in too great an amount, the dielectric constant of the film deteriorates. Therefore, in view of the improvement in the figure of merit of the insulator layer, it is preferable to set the yttrium amount to fall in the range of 8 to 30 atomic % with respect to the sum of tantalum and yttrium taken as 100 atomic %.

When $WO_3$ is added into the simple $Ta_2O_5$ insulator film, the insulation property of the composite oxide insulator film deteriorates sharply when the tungsten amount exceeds 4 atomic % with respect to the sum of tantalum and tungsten taken as 100 atomic %. Hence, in view of the improvement in the figure of merit of the insulator layer, an optimum tungsten amount falls in the range of 2 to 4 atomic % with respect to the sum of tantalum and tungsten taken as 100 atomic %.

The luminous layer has been known to exhibit an optimum light-emitting efficiency when it has a thickness of 0.5 to 1 micrometer. In order to apply an appropriate electric field to the luminous layer having such a thickness, to accumulate sufficient electric charges so as to let the boundary surfaces between the luminous layer and the insulator layers carry out the electric field luminescence, and to operate the present thin film EL element at a low voltage, it is preferable to set thicknesses of the insulator layers disposed on both sides of the luminous layer at from 0.2 to 2.0 micrometers. It is further preferable to set the thicknesses of the insulator layers at 0.3 to 1.0 micrometer. When the insulator layers have thicknesses less than 0.2 micrometers, the threshold voltage for the luminescence decreases. However, the voltage range allowing a stable light-emitting luminance comes to be limited. Moreover, insulator layers having thicknesses less than 0.2 micrometers are not preferable at all. Namely, if such is the case, the yield loss deteriorates during the formation of the insulator layers because pin holes, cracks, and the like appear in the insulator layers. On the other hand, when the insulator layers have thicknesses more than 2.0 micrometers, the threshold voltage for the luminescence increases, and the electric charges, which are accumulable in the boundary surfaces between the luminous layer and the insulator layers, decrease so that the light-emitting luminance deteriorates. Thus, insulator layers having thicknesses of more than 2.0 micrometers are not preferable.

When the insulator layers are formed while keeping substrate temperature in a low temperature range of from 200° to 300° C., it is possible to form insulator layers which have sufficient maximum accumulable electric charges. Thus, the insulator layers can be formed at a temperature which is equivalent to or less than the substrate temperatures for forming the luminous layers or electrodes.

Accordingly, the process for forming the EL ele can be applied to the insulator layers form ease. Further, since stacked insulator la employed, but since composite insulator la ployed, a mixed evaporation source or sputtering target can be used during electron beam vapor deposition, sputtering, or the like. As a result, it is possible to simplify the manufacturing process for the insulator layers. Naturally, the insulator layers can be adapted to processes for manufacturing EL elements, processes which are intended for a similar purpose.

In the thin film EL element according to the present invention the composite oxide insulator film consisting essentially of $Ta_2O_5$ and at least one of $Y_2O_3$ and $WO_3$ is used in the insulator layers. When the composite oxide insulator films consisting essentially of $Ta_2O_5$ and $WO_3$ is used as the insulator layers, the insulator layers exhibit relative dielectric constants of approximately 20 which is higher than that of conventional insulator layers containing only the simple $Ta_2O_5$ insulator film. Hence, it is possible to further reduce the threshold voltage of the EL element operating with AC for carrying out the luminescence with respect to conventional insulator layers which employ materials such as $Y_2O_3$, $Si_3N_4$, $SiO_2$, etc., having comparatively low relative dielectric constants.

Further, the present insulator layers are made to exhibit relative dielectric constants which deteriorate to a lesser degree by the addition of $Y_2O_3$ or $WO_3$. As a result, they exhibit threshold voltages which hardly vary when compared with conventional insulator layers containing only the simple $Ta_2O_5$ insulator film.

Furthermore, the present insulator layers exhibit dielectric breakdown fields as high as approximately 4 MV/cm. Namely, they can be subjected to a wide range of voltage, e.g., from the light-emitting threshold voltage to a voltage resulting in the dielectric breakdown. As a result, they enable the present thin film EL element to operate more stably than conventional insulator layers containing the simple $Ta_2O_5$ insulator film.

Moreover, the present insulator layers are made to exhibit enlarged maximum accumulable electric charges which are one of the factors determining the maximum light-emitting luminance of the EL element. As a result, it is possible to manufacture an EL element which can exhibit a light-emitting luminance higher than that of conventional EL elements employing conventional insulator layers containing only the simple $Ta_2O_5$ insulator film.

Similar to conventional EL elements, the luminous centers of the present EL element are excited by applying a high electric field thereto, and thereby the present EL element carries out luminescence. Thus, in the present EL element the application of a high electric field raises the issue of how to stabilize the life of the present EL element for a long period of time. The lifetime is closely related to the dielectric breakdown of the insulator layers, and the dielectric breakdown depends on time passage. Namely, the longer the lives of the insulator layers, the longer the life of the EL element itself. The present insulator layers include the composite oxide insulator film consisting essentially of $Ta_2O_5$ and at least one of the oxides, e.g., $Y_2O_3$ and $WO_3$. Therefore, the lives of the present insulator layers are longer than those of conventional insulator layers containing only the simple $Ta_2O_5$ insulator film, and thereby it is possible to make the life of the present EL element longer.

As has been described so far, the thin film EL element according to the present invention can be operated at high luminance with only a minimum low voltage required for such an operation. This advantageous effect has resulted from the characteristics of the present insulator layers including the composite oxide insulator film consisting essentially of $Ta_2O_5$ and at least one of $Y_2O_3$ and $WO_3$ which distinguish over conventional insulator layers including simple $Ta_2O_5$, $Y_2C_3$, $Si_3N_4$, $SiO_2$ insulator films only, in view of factors such as the relative dielectric constant, the dielectric breakdown field, the maximum accumulable electric charge, etc.

Further, the life and the stability of the present EL element depend substantially on the lives of the present insulator layers. Here, the present insulator layers exhibit longer lives against dielectric breakdown which develops as time passes, and they have good adhesion to the luminous layer. In addition, the present EL element is made into a self-healing type in terms of the breakdown mode. All in all, the present invention provides advantages in making long-life, stable, etc. display devices.

Furthermore, the present insulator layers can be formed while keeping a substrate temperature in the low temperature range of from 200° to 300° C. Therefore, they can be formed on any luminous layer, regardless of the materials employed for forming the luminous layer. In addition, the present insulator layers are composite films. Hence, they do not require complicated manufacturing processes, and accordingly they are of merit in view of their manufacturing process.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

Figure 1:
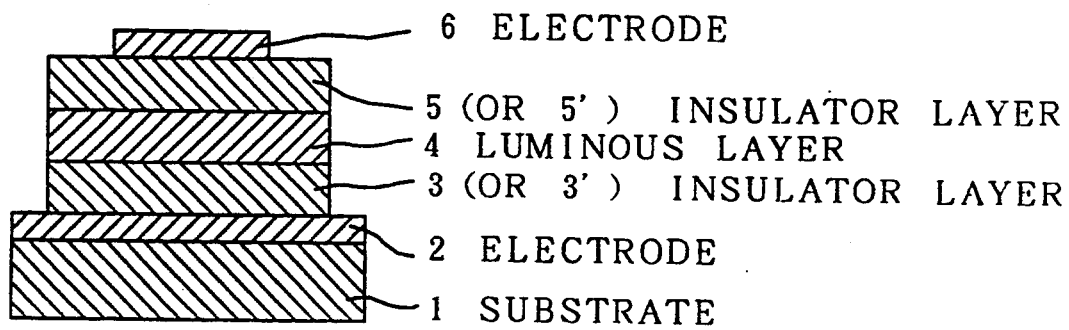
FIG. 1 is a schematic cross sectional view of a construction of a thin film EL element of a preferred embodiment according to the present invention or a conventional thin film EL element.

FIG. 1 illustrates a schematic cross sectional view of a construction of a thin film EL element of a preferred embodiment according to the present invention. The thin film EL element comprises a glass substrate 1, an ITO film formed and stacked on a surface of the glass substrate 1 as a transparent electrode 2, an insulator layer 3 formed and stacked on a surface of the transparent electrode 2, a luminous layer 4 formed and stacked on a surface of the insulator layer 3, an insulator layer 5 formed and stacked on a surface of the luminous layer 4, and an aluminum electrode 6 formed and stacked on a surface of the insulator layer 5 so as to be a topmost surface thereof.

The insulator layers 3 and 4 are formed of a composite oxide insulator film including $Ta_2O_5$ and either $Y_2O_3$ or $WO_3$. The luminous layer 4 is formed of zinc sulfide (ZnS) doped with either terbium (Tb) emitting green light or praseodymium (Pr) emitting white light.

Evaluation on Insulator Films

First of all, the insulator layers of the preferred embodiments according to the present invention were examined for their electric characteristics, e.g., dielectric breakdown fields, relative dielectric constants and figures of merit.

The following six insulator films were formed on Si substrates, and Al was further vacuum-deposited as an electrode on the following six insulator films: a simple $Ta_2O_5$ insulator film including $Y_2O_3$ in an amount of 0 atomic %, four types of the present composite oxide insulator films including $Ta_2O_5$ and $Y_2O_3$ in yttrium amounts of 8.2 atomic %, 13.7 atomic %, 19.9 atomic % and 32.0 atomic % with respect to the sum of tantalum and yttrium therein taken as 100 atomic %, and a simple $Y_2O_3$ insulator film including $Y_2O_3$ in an amount of 100 atomic %. The insulator films were formed with a sputtering apparatus, and the sputtering was carried out under the following conditions: each of $Y_2O_3$ and $Ta_2O_5$ oxide sintered targets was employed. The sputtering atmosphere was argon including oxygen in an amount of 30%. The Si substrates were kept at a temperature of 300° C. during sputtering. The insulator films were formed in a thickness of 200 angstroms (i.e., 0.02 micrometers). The contents of $Y_2O_3$ in the resulting insulator films were analyzed quantitatively by Rutherford Back Scattering analysis.

Figure 2:
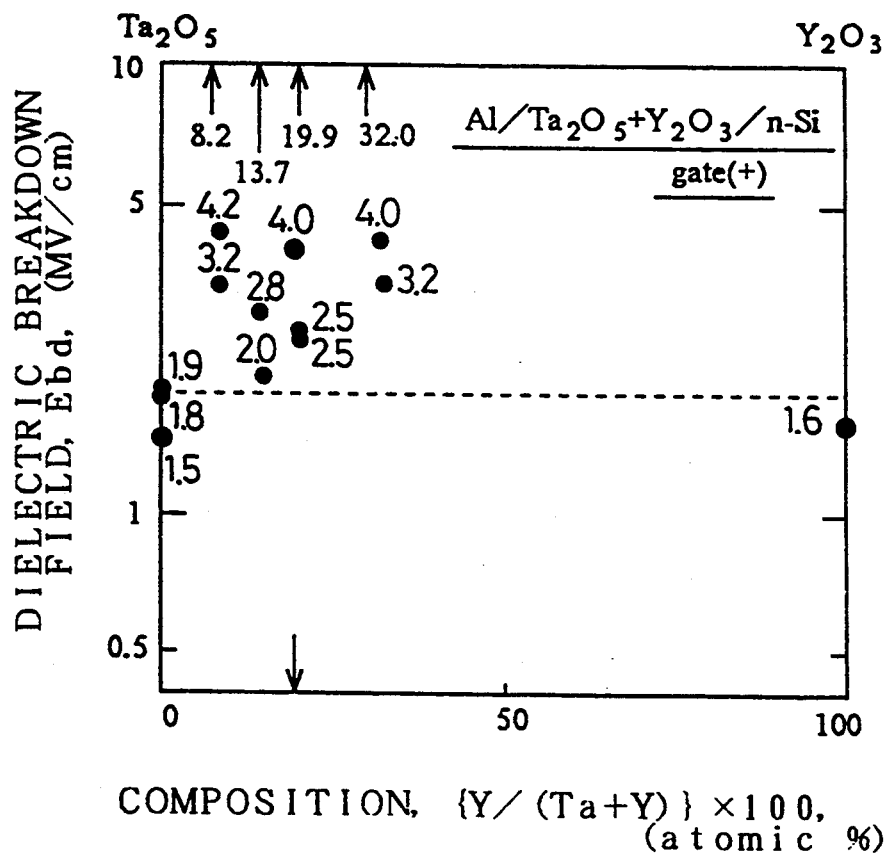
FIG. 2 is a scatter diagram illustrating the relationships between the yttrium amounts in the insulator layers, which included $Y_2O_3$ and were employed in the EL elements of the preferred embodiments, and the dielectric breakdown fields exhibited by the insulator layers.

FIG. 2 is a scatter diagram which illustrates the relationships between the yttrium amounts of the simple $Ta_2O_5$ insulator film free from $Y_2O_3$, the present composite oxide insulator films including $Ta_2O_5$ and $Y_2O_3$, and simple the $Y_2O_3$ insulator film free from $Ta_2O_5$, and the dielectric breakdown fields $E_{bd}$ thereof. In FIG. 2, the ordinate expresses the dielectric breakdown field $E_{bd}$ (in MV/cm) of the insulator films, and the abscissa expresses the atomic % of yttrium in the insulator films. Hereinafter, an atomic % of yttrium in an insulator film means the atomic % of yttrium elements in the insulator film when the sum of tantalum elements and yttrium elements therein is taken as 100 atomic %. As can be appreciated from FIG. 2, the simple $Ta_2O_5$ insulator film including tantalum elements in the amount of 100 atomic % exhibited a dielectric breakdown field in a range of 1.5 to 1.9 MV/cm. On the other hand, the present composite oxide insulator films, including yttrium in the amount of 8 to 30 atomic % with respect to the sum of tantalum and yttrium therein taken as 100 atomic %, exhibited the dielectric breakdown fields higher than 1.9 MV/cm which is illustrated with a horizontal broken line in FIG. 2 and which was exhibited by the simple $Ta_2O_5$ insulator film. Specifically, the dielectric breakdown fields exhibited by the present composite oxide insulator films, including yttrium in the above-described amount with respect to the sum of tantalum and yttrium therein taken as 100 atomic % were approximately twice that of the simple $Ta_2O_5$ insulator film.

Figure 4:
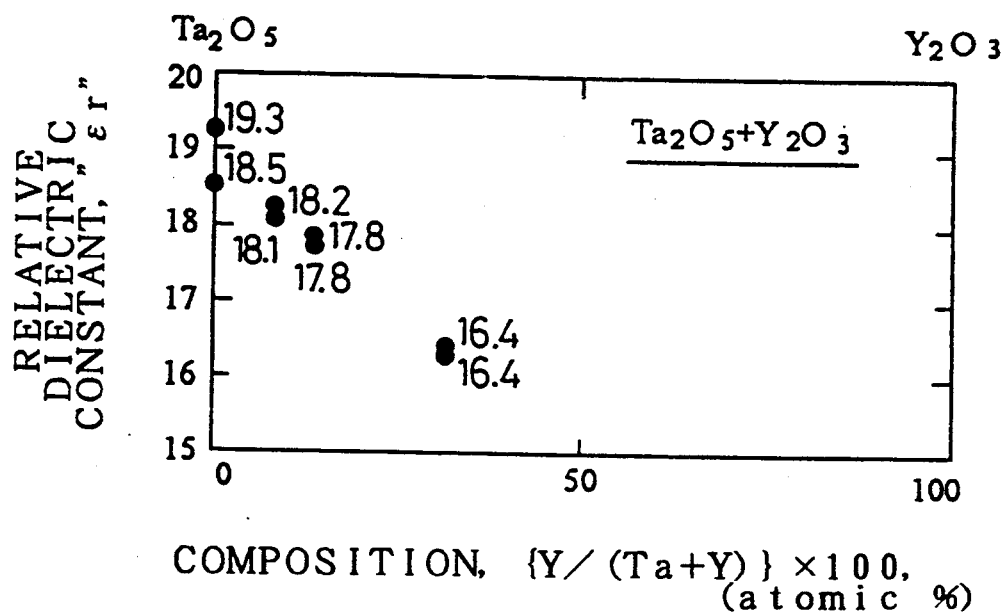
FIG. 4 is a scatter diagram illustrating the relationships between the yttrium amounts in the insulator layers, which included $Y_2O_3$ and were employed in the EL elements of the preferred embodiments, and the relative dielectric constants exhibited by the insulator layers.

Further, FIG. 4 is a scatter diagram which illustrates the relationships between the compositions of the same insulator films (i.e., the simple $Ta_2O_5$ insulator film free from $Y_2O_3$, the present composite oxide insulator films including $Ta_2O_5$ and $Y_2O_3$, and the simple $Y_2O_3$ insulator film free from $Ta_2O_5$) and the relative dielectric constants "$\xi_r$" thereof. In FIG. 4, the ordinate expresses the relative dielectric constant "$\xi_r$" of the insulator films, and the abscissa expresses the atomic % of yttrium in the insulator films. As can be noted from FIG. 4, the relative dielectric constant "$\xi_r$" tended to decrease gradually as the yttrium amount increased, but the present composite oxide insulator films including $Ta_2O_5$ and $Y_2O_3$ exhibited relative dielectric constants "$\xi_r$" of approximately at least 16.

Figure 6:
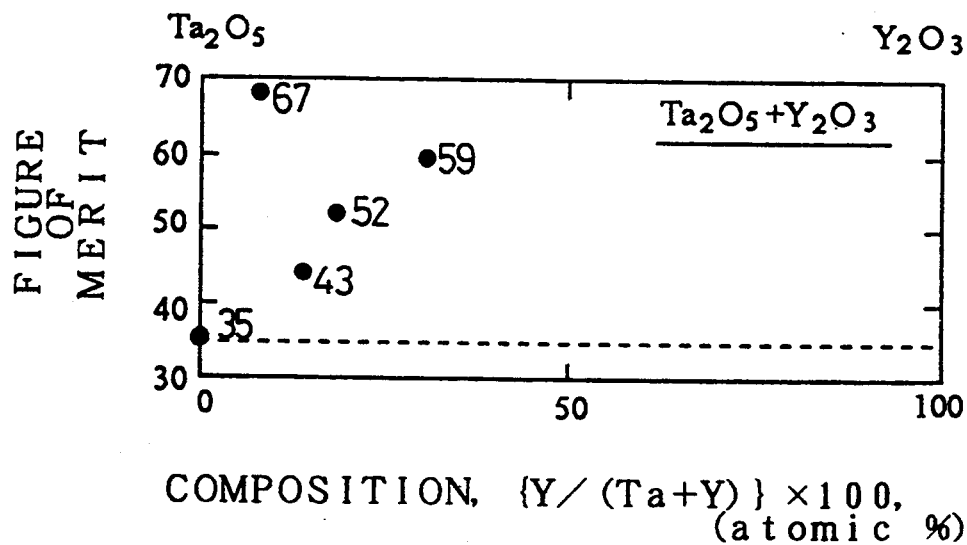
FIG. 6 is a scatter diagram illustrating the relationships between the yttrium amounts in the insulator layers, which included $Y_2O_3$ and were employed in the EL elements of the preferred embodiments, and the figures of merit exhibited by the insulator layers.

Furthermore, FIG. 6 is a scatter diagram which illustrates the relationships between the compositions of the same insulator films (i.e., the simple $Ta_2O_5$ insulator film free from $Y_2O_3$, the present composite oxide insulator films including $Ta_2O_5$ and $Y_2O_3$, and the simple $Y_2O_3$ insulator film free from $Ta_2O_5$) and the figures of merit (i.e., the products of the relative dielectric constants and the dielectric breakdown fields) thereof. In FIG. 6, the ordinate expresses the figure of merit, and the abscissa expresses the atomic % of yttrium in the insulator films. As can be understood from FIG. 6, the present composite oxide insulator films including $Ta_2O_5$ and $Y_2O_3$ exhibited figures of merit which increased as the yttrium amount increased. Hence, when taking both of the evaluation results illustrated in FIGS. 4 and 6 into consideration, it is preferable to add $Y_2O_3$ into the simple $Ta_2O_5$ insulator film in 8 to 30 atomic % yttrium with respect to the sum of tantalum and yttrium therein taken as 100 atomic %.

In addition, instead of the present composite oxide insulator films including $Ta_2O_5$ and $Y_2O_3$, four other types of present composite oxide insulator films including $Ta_2O_5$ and $WO_3$ in tungsten amounts of 2.3 atomic %, 3.6 atomic %, 15.8 atomic % and 25.1 atomic % with respect to the sum of tantalum and tungsten therein taken as 100 atomic % on the same Si substrates under the same conditions, and Al was further vacuum-deposited as an electrode on the insulator films. The insulator films thus sandwiched between the Si substrates and the Al electrodes were also evaluated for their dielectric breakdown electric fields, relative dielectric constants and figures of merit. The results of the evaluations were illustrated in FIGS. 3, 5 and 7, respectively.

Figure 3:
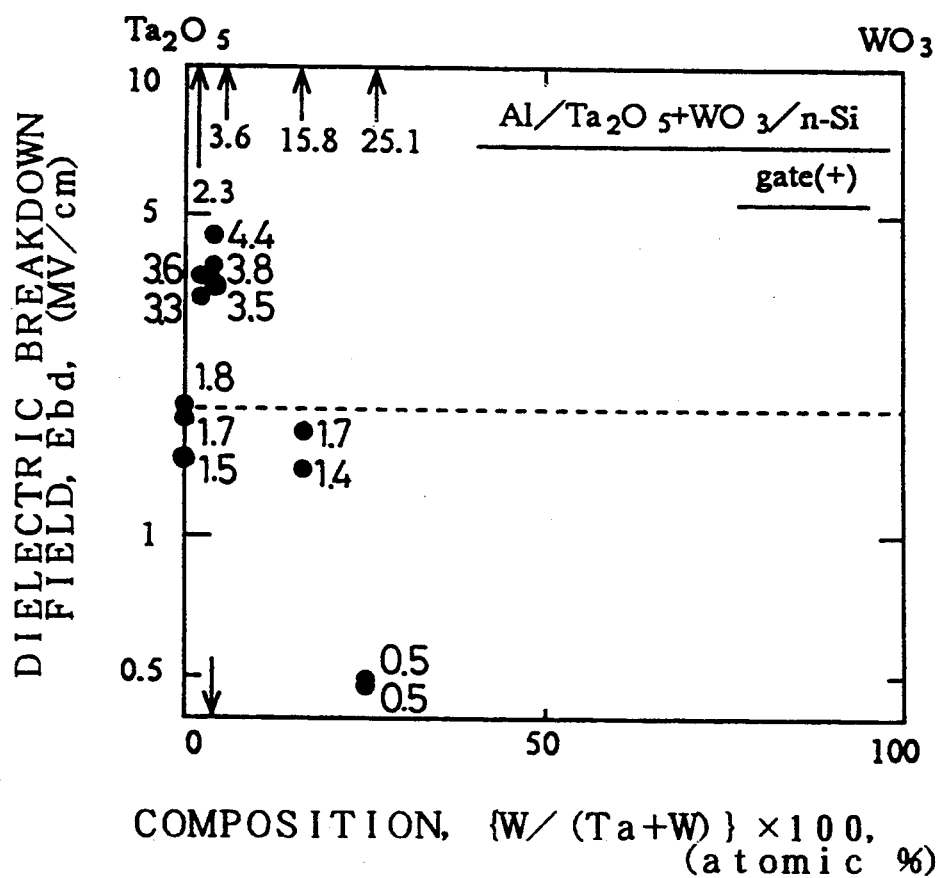
FIG. 3 is a scatter diagram illustrating the relationships between the tungsten amounts in the insulator layers, which included $WO_3$ and were employed in the EL elements of the preferred embodiments, and the dielectric breakdown fields exhibited by the insulator layers.

FIG. 3 is also a scatter diagram which illustrates the relationships between the tungsten amounts of the simple $Ta_2O_5$ insulator film free from $WO_3$ and the present composite oxide insulator films including $Ta_2O_5$ and $WO_3$, and the dielectric breakdown fields $E_{bd}$ thereof. Also, in FIG. 3, the ordinate expresses the dielectric breakdown field $E_{bd}$ (in MV/cm) of the insulator films, and the abscissa expresses the atomic % of tungsten in the dielectric films. As can be appreciated from FIG. 3, when $WO_3$ was added into the simple $Ta_2O_5$ insulator film in an amount of 2 to 4 atomic % tungsten with respect to the sum of tantalum and tungsten therein taken as 100 atomic %, the present composite oxide insulator films including $Ta_2O_5$ and $WO_3$ exhibited dielectric breakdown fields which were improved to approximately twice or more that of the simple $Ta_2O_5$ insulator film free from $WO_3$. However, when $WO_3$ was added into the simple $Ta_2O_5$ film in an amount of tungsten more than 4 atomic %, the present composite oxide insulator films including $Ta_2O_5$ and $WO_3$ exhibited the dielectric breakdown fields which were deteriorated sharply. For instance, when $WO_3$ was added into the simple $Ta_2O_5$ film in an amount of 25.1 atomic % tungsten, the present composite oxide insulator film including $Ta_2O_5$ and $WO_3$ exhibited dielectric breakdown fields which were deteriorated below that of the simple $Ta_2O_5$ insulator film and which is illustrated with a horizontal broken line in FIG. 3.

Figure 5:
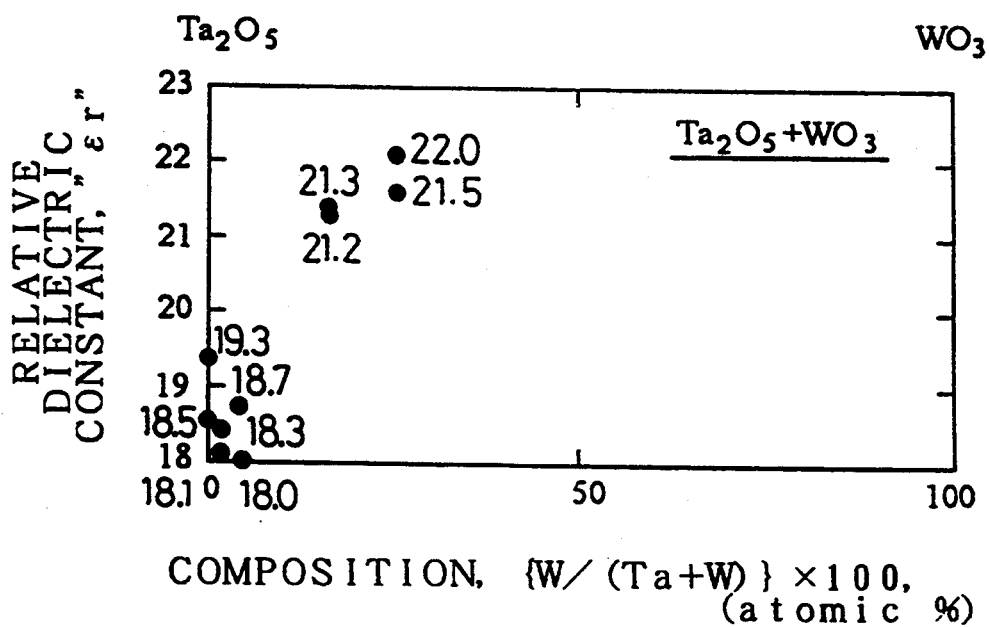
FIG. 5 is a scatter diagram illustrating the relationships between the tungsten amounts in the insulator layers, which included $WO_3$ and were employed in the EL elements of the preferred embodiments, and the relative dielectric constants exhibited by the insulator layers.

Contrary to the evaluation results on the relative dielectric constants of the present composite oxide insulator films of $Ta_2O_5$ and $Y_2O_3$ illustrated in FIG. 4, the present composite oxide insulator films of $Ta_2O_5$ and $WO_3$ exhibited higher relative dielectric constants than the simple $Ta_2O_5$ insulator film did as illustrated in FIG. 5. Also, in FIG. 5, the ordinate expresses the relative dielectric constant "ξ_r" of the insulator films, and the abscissa expresses the atomic % of tungsten in the insulator films.

Figure 7:
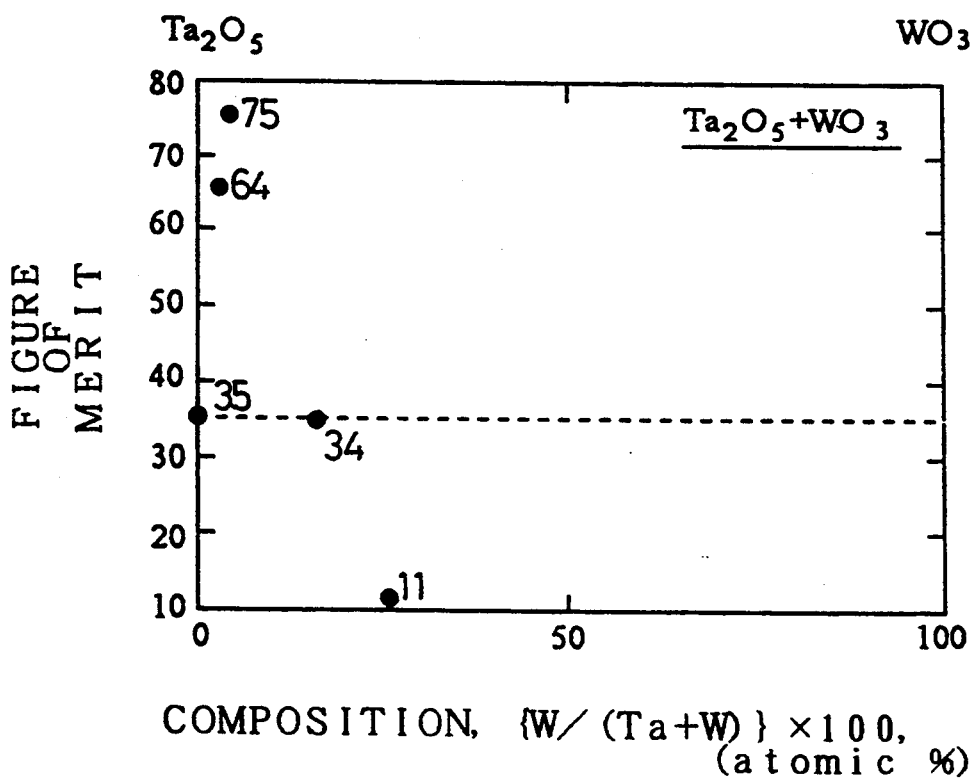
FIG. 7 is a scatter diagram illustrating the relationships between the tungsten amounts in the insulator layers, which included $WO_3$ and were employed in the EL elements of the preferred embodiments, and the figures of merit exhibited by the insulator layers.

As can be seen from FIG. 7 which illustrates the figures of merit of the present composite oxide insulator films of $Ta_2O_5$ and $WO_3$, when $WO_3$ was added into the simple $Ta_2O_5$ insulator film in an amount of 2 to 4 atomic % tungsten with respect to the sum of tantalum and tungsten therein taken as 100 atomic %, the present composite oxide insulator films including $Ta_2O_5$ and $WO_3$ exhibited figures of merit which were twice that of the simple $Ta_2O_5$ insulator film free from $WO_3$. Also, in FIG. 7, the ordinate expresses the figure of merit, and the abscissa expresses the atomic % of yttrium in the insulator films.

Hence, when taking all of the evaluation results illustrated in FIGS. 3, 5 and 7 into consideration, it is preferable to add $WO_3$ into the simple $Ta_2O_5$ insulator film in amount of 2 to 4 atomic % tungsten with respect to the sum of tantalum and tungsten therein taken as 100 atomic %.

Moreover, the following five insulator films, e.g., the present composite oxide insulator film including $Ta_2O_5$ and $Y_2O_3$ with yttrium in an amount of 19.9 atomic % with respect to the sum of tantalum and yttrium therein taken as 100 atomic %, the present composite oxide insulator film including $Ta_2O_5$ and $WO_3$ with tungsten in an amount of 3.6 atomic % with respect to the sum of tantalum and tungsten therein taken as 100 atomic %, the simple $Ta_2O_5$ insulator film, the simple $Y_2O_3$ insulator film, and a simple $SiO_2$ insulator film, were evaluated for their maximum accumulable electric charges. The results of this evaluation are set forth in Table 1 below together with their dielectric electric breakdown fields and relative dielectric constants.

The following fact is apparent from Table 1: the present composite oxide insulator film including $Ta_2O_5$ and $Y_2O_3$ and the present composite oxide insulator film including $Ta_2O_5$ and $WO_3$ exhibited figures of merit of 84 microcoulomb/cm² which were higher than those of the other insulator films. Thus, the present composite oxide insulator films exhibited remarkably high figures of merit on which the functions of the EL element depend. Therefore, it is very advantageous to add either $Y_2O_3$ or $WO_3$ into the simple $Ta_2O_5$ insulator film in order to make a high performance EL element.

TABLE 1

| Composition | Figure of Merit (microcoulomb /cm²) | Relative Dielectric Constant | Dielectric Breakdown Field (MV/cm) |
|---|---|---|---|
| $Ta_2O_5 + Y_2O_3$ | 84 | 21 | 4 |
| $Ta_2O_5 + WO_3$ | 84 | 21 | 4 |
| $Ta_2O_5$ | 84 | 23 | 2 |
| $Y_2O_3$ | 12 | 12 | 1 |
| $SiO_2$ | 32 | 4 | 8 |

Note: Thicknesses of the insulator films were 0.08 micrometers (i.e., 800 angstroms).

Preferred Embodiment

A thin film EL element of a preferred embodiment (hereinafter simply referred to as a "present EL element") was manufactured by using the composite oxide insulator film including $Ta_2O_5$ and $Y_2O_3$ with an amount of 19.9 atomic % yttrium with respect to the sum of tantalum and yttrium therein taken as 100 atomic %. Namely, as illustrated in FIG. 1, an ITO transparent electrode 2 was formed on a glass substrate in a thickness of 0.2 micrometers (i.e., 2000 angstroms), an insulator layer 3 made of the present composite oxide insulator film including $Ta_2O_5$ and $Y_2O_3$ was formed by sputtering in a thickness of about 0.3 micrometers (i.e., 3000 angstroms). In the sputtering operation, $Y_2O_3$ and $Ta_2O_5$ oxide sintered targets were employed, and the insulator layer 3 was formed with a radio frequency magnetron binary multiple sputtering apparatus. Further, wattages applied to the sputtering apparatus were controlled so that a ratio of $Y_2O_3$ with respect to the sum of $Ta_2O_5$ and $Y_2O_3$ is about 20% in an atom-number ratio in the insulator layer 3. Furthermore, since oxygen is insufficiently taken into the insulator layer 3 made of the composite oxide insulator during the formation thereof, oxygen was added into an argon gas in an amount of 30% in order to compensate the oxygen insufficiency. Moreover, the glass substrate 1 was kept at a temperature of 200° C. during the sputtering operation.

After completing the formation of the insulator layer 3, a luminous layer 4 including ZnS doped with Tb emitting green light was formed on the insulator layer 3 in a thickness of about 0.5 micrometers (i.e., 5000 angstroms) in an argon gas atmosphere while keeping the temperature of the glass substrate 1 at 200° C. As aforementioned, instead of ZnS doped with Tb emitting green light, the luminous layer 4 may include ZnS doped with Pr emitting white light.

Thereafter, an insulator layer 5 was formed on the luminous layer 4 in the same manner as that of insulator layer 3. Finally, a topmost aluminum electrode 6 was formed on the insulator layer 5 by vacuum-depositing Al in a thickness of about 0.3 micrometers (i.e., 3000 angstroms). The present EL element was thus prepared.

For a comparison, a comparative EL element was manufactured by forming insulator layers 3' and 5' including $Ta_2O_5$ but being free from $Y_2O_3$. Other than the compositions of the insulator layers 3' and 5', the comparative EL element had the same construction as that of the present EL element.

The present EL element includes luminous layer 4 which is a semiconductor containing a compound including at least a combination of a group II element and a group VI element of the Periodic Table. However, the present EL element is a transparent thin film which exhibits a broad band gap, and accordingly it can be regarded as an equivalent circuit, to which a capacitor film is connected in series, provided that a voltage of a light-emitting threshold voltage or less is applied in an electric field required for light-emitting or less. Further, the present EL element emits light when a predetermined electric field, e.g., an electric field of 1 to 2 MV/cm, which enables the electrons, emitted from the interface levels between the luminous layer 4 and the insulator layers 3 and 5, to fully excite the luminous centers. In the meantime, an electric current flows in the luminous layer 4, and accordingly the present EL element can be regarded as an equivalent circuit, to which a resistance is connected in parallel. As a result, the electric field applied to the luminous layer 4 is clamped. When the present EL element emits light, insulator layers 3 and 5 make the electric current exciting the luminous layer 4 alternately flow stably, thereby regulating the flow direction of the electric current in luminous layer 4. As a result, insulator layers 3 and 5 stabilize the present EL element.

Under voltage application of the light-emitting threshold voltage or less, let an electrostatic capacity of the luminous layer 4 be "$C_z$," an electrostatic capacity of the insulator layers 3 and 5 be "$C_i$," and a voltage applied to the entire present EL element be "$V_{tot}$." The voltage "$V_i$" applied to the luminous layer 4 can be expressed by the following equation:

$$V_i = V_{tot} / \{1 + (C_z/C_i)\}.$$

Therefore, it is necessary to employ a material which has a high electrostatic capacity, i.e., which exhibits a large relative dielectric constant, for insulator layers 3 and 5 in order to apply the predetermined voltage to the luminous layer 4 effectively and in order to avoid applying an ineffective voltage to the insulator layers 3 and 5.

When a voltage of the light-emitting threshold voltage or more is applied to the present EL element, the voltage applied to the luminous layer 4 is clamped at a predetermined value. Accordingly, all of the remaining voltage comes to be applied to the insulator layers 3 and 5. Hence, it is necessary to employ a material which exhibits a large dielectric breakdown electric field for the insulator layers 3 and 5.

The light-emitting luminance of the present EL element depends on the product of the light-emitting efficiency, the number of the luminous centers and the number of the electrons required for the excitation. Let the characteristics of the luminous layer 4 be the same, the light-emitting efficiency is equivalent to the number of the luminous centers, and accordingly the light-emitting luminance of the present EL element depends on the number of the exciting electrons required. Provided that a light-emitting threshold voltage or less is applied in an electric field required for light-emitting or less, the present EL element can be regarded as an equivalent circuit, to which a capacitor film is connected in series. Consequently, the number of the electrons required for the excitation is equivalent to the maximum accumulable electric charges of the insulator layers 3 and 5. Thus, it is necessary to employ a material which exhibits a large maximum accumulable electric charge for the insulator layers 3 and 5 in order to carry out the EL light-emission at a high luminance.

As set forth in Table 1 above, the present composite oxide insulator films including $Ta_2O_5$ and either $Y_2O_3$ or $WO_3$ has superior characteristics to those of other simple insulator films.

Figure 8:
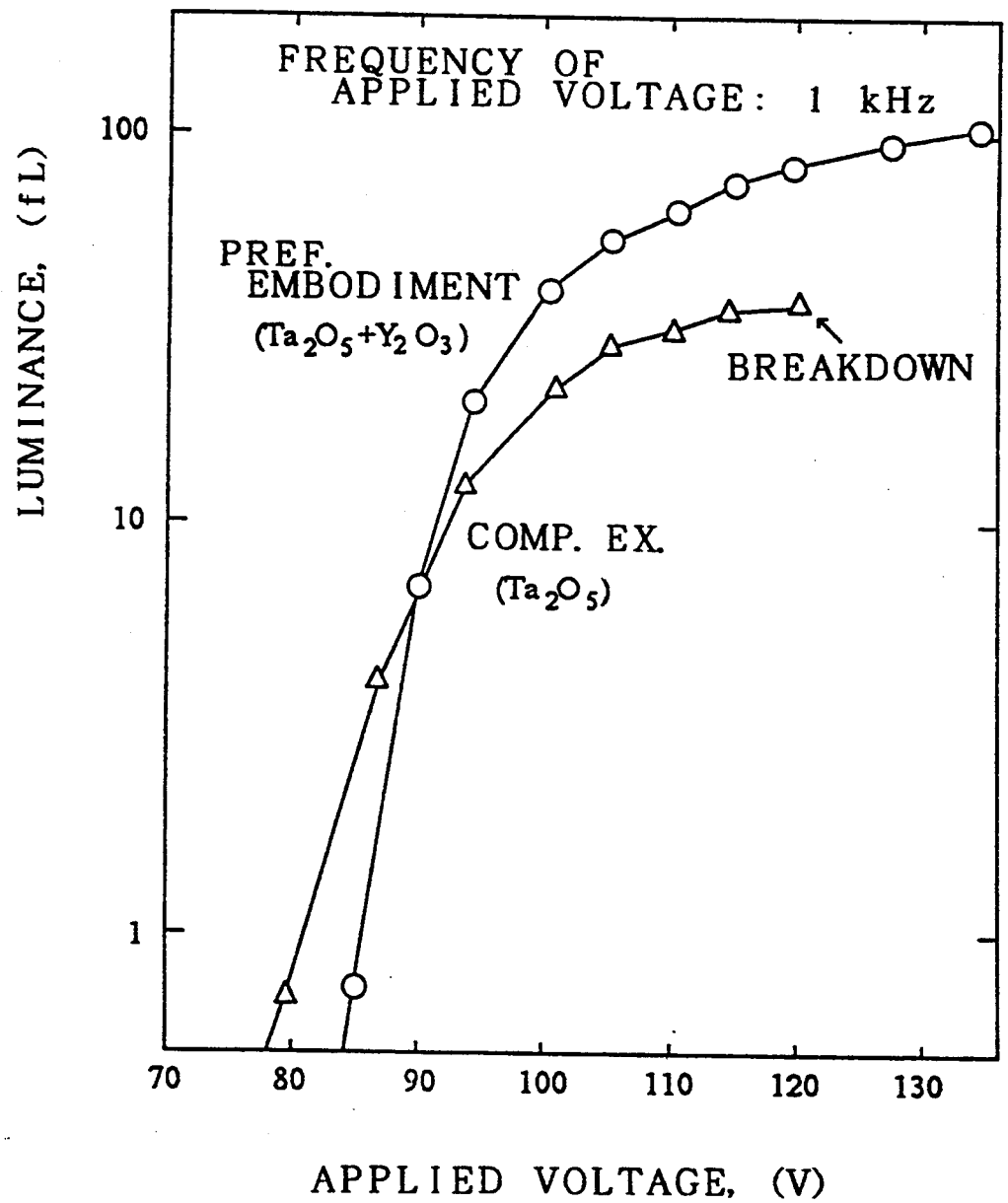
FIG. 8 is a graph illustrating the relationships between the light-emitting luminances and the applied voltages, relationships which were exhibited by an EL element of a preferred embodiment and an EL element of a comparative example.

FIG. 8 illustrates light-emitting luminance-applied voltage characteristic curves which were exhibited by the present and the comparative EL elements. As described above, the present EL element employed insulator layers 3 and 5 made of composite oxide insulator films including $Ta_2O_5$ and $Y_2O_3$, and the comparative EL element employed the insulator layers 3' and 5' made of the simple $Ta_2O_5$ insulator film free from any additive. This is why the present EL element exhibited the threshold value voltages which did not vary as much as the comparative EL element did as illustrated in FIG. 8. Although the light-emitting luminance-applied voltage characteristic curves of the other comparative EL elements which employed the insulator layers 3' and 5' made of the simple $SiO_2$, $Si_3N_4$ and $Y_2O_3$ insulator films free from any additive are not illustrated in FIG. 8, the present EL element exhibited lower threshold value voltages than these comparative EL elements did.

Further, since the present EL element exhibited a higher element-breakdown voltage as well as a higher maximum luminance than the comparative EL elements did, the present EL element could carry out EL light-emission more stably in a wider voltage application range.

Furthermore, since the insulator layers 3 and 5 of the present EL element were made of the composite oxide insulator film concluding $Ta_2O_5$ and $Y_2O_3$ which exhibited the large relative dielectric constant, the large dielectric breakdown electric field and the large maximum accumulable electric charge, the present EL element could not only exhibit the high luminance and the low threshold voltages, but also operate in a wide operating voltage range satisfactorily.

The luminous layers 4 of the present and the comparative EL elements were made of material which is likely to absorb moisture in the atmosphere, and accordingly the breakdown of the EL elements often results from the coming-off at the interfaces between the luminous layers 4 and the insulator layers 3 and 5 (or 3' and 5'). Hence, the lives and the stabilities of the EL elements are believed to depend on the adhesion between the luminous layer 4 and the insulator layers 3 and 5 (or 3' and 5'). If the breakdown of one pixel does not result in the breakdown of other pixels, the reliabilities and the lives of the entire EL element can be upgraded.

Although the film forming processes and the film forming conditions vary the adhesion between the luminous layer 4 and the insulator layers 3 and 5, it is believed that the adhesion depends on portions of the luminous layer 4 and the insulator layers 3 and 5 in which the atoms are bonded chemically. Therefore, it is necessary to employ a material which exhibits good adhesion to the luminous layer 4 for the insulator layers 3 and 5.

Table 2 below sets forth the evaluation results on the adhesion between the luminous layer 4 and the insulator layers 3 and 5 of the present EL element and those of the comparative EL elements. The evaluation was carried out by subjecting the EL elements to a so-called peeling test. In the peeling test, a Scotch tape (registered trade mark) was first applied on the insulator layer 5 or 5'. Then, the tape was peeled off, and the insulator layers 5 or 5' was examined to determine whether it remained on the luminous layer 4 or not.

When the insulator layer 5' was made of the simple $Ta_2O_5$ insulator film, the insulator layer 5' came off with tape easily. On the other hand, the insulator layer 5 of the present EL element was made by adding $Y_2O_3$, which inherently exhibits a good adhesion and a strong electronic affinity to the luminous layer 4, into the simple $Ta_2O_5$ insulator film. Thus, it is believed that the bonding was improved at the interface between the luminous layer 4 the insulator layer 5 of the present EL element by the yttrium atoms. It goes without saying that the same evaluation results could have been obtained if the insulator layers 3 and 3' were tested similarly.

TABLE 2

| Composition | Adhesion |
| --- | --- |
| $Ta_2O_5 + Y_2O_3$ | Good |
| $Ta_2O_5$ | Bad |
| $Y_2O_3$ | Good |

Table 3 below sets forth the breakdown modes of the present and the comparative EL elements. The comparative EL elements, i.e., conventional EL elements, exhibited breakdown modes of the propagation type during breakdown. However, the present EL element basically exhibited the breakdown mode of the self-healing type during breakdown. In the present EL element, the breakdown mode depends on the state of the interface between the ITO transparent electrode 2 and the insulator layer 3, the state of the interface between the aluminum electrode 6 and the insulator layer 5, or the states of the interfaces between the luminous layer 4 and the insulator layers 3 and 5.

Here, there have been reports that the breakdown mode also depends on insulator materials. The mechanism of the breakdown has not been explained explicitly yet; however, roughly speaking, it is believed to occur as follows: the microstructural defects in insulator layers 3 and 5, the vacant oxygen lattices therein and the vacant metal lattices therein trap electrons, and the trapped electrons form passages for electric currents, and breakdown eventually occurs. In the meantime, the electric currents generate Joule heat. As a result, the insulator layers 3 and 5 or the electrodes 2 and 6 evaporate locally, they discharge electrically, and thereby mechanical fractures occur. Thus, it is believed that the breakdown mode depends on the vapor pressures of the insulator materials, the thermal expansion coefficient differences resulting from the heat generation, etc.

TABLE 3

| Composition | Breakdown Mode |
| --- | --- |
| $Ta_2O_5 + Y_2O_3$ | Self-healing Type |
| $Ta_2O_5$ | Propagation Type |
| $Y_2O_3$ | Self-healing Type |
| $SiO_2$ | Self-healing Type |

Thus, in the present EL element, not only the electrical properties of the simple $Ta_2O_5$ insulator film, but also the thermal and the mechanical properties thereof were improved by adding $Y_2O_3$ into the simple $Ta_2O_5$ insulator film. As a result, it is believed that the $Y_2O_3$ addition transformed one of the conventional characteristics of the simple $Ta_2O_5$ insulator film, e.g., the propagation type breakdown mode, into the self-healing type breakdown mode in the present EL element.

In addition, there has been a problem associated with the production of conventional EL elements that the resistance value of the ITO transparent electrode 2 was increased by the formation of insulator layers 3' and 5' and the luminous layer 4 or by heat treatment adapted for improving the light-emitting efficiency of the EL element after the completion thereof. Namely, when the resistance value of ITO transparent electrode 2 is increased, the EL element emits blurred and uneven light, and the heat generation resulting from the increased resistance value accelerates the breakdown of the EL element. It is believed that the resistance value of the ITO transparent electrode 2 is increased by the following mechanisms: when an oxide insulator layer adjacent to the ITO transparent electrode 2 is instable, the indium (In) of the ITO transparent electrode 2 diffuses into the oxide insulator layer so that the resistance value of the ITO transparent electrode 2 is increased, or the resistance value of the ITO transparent electrode 2 is increased by the oxidation or the reduction reaction of the ITO transparent electrode 2.

Figure 9:
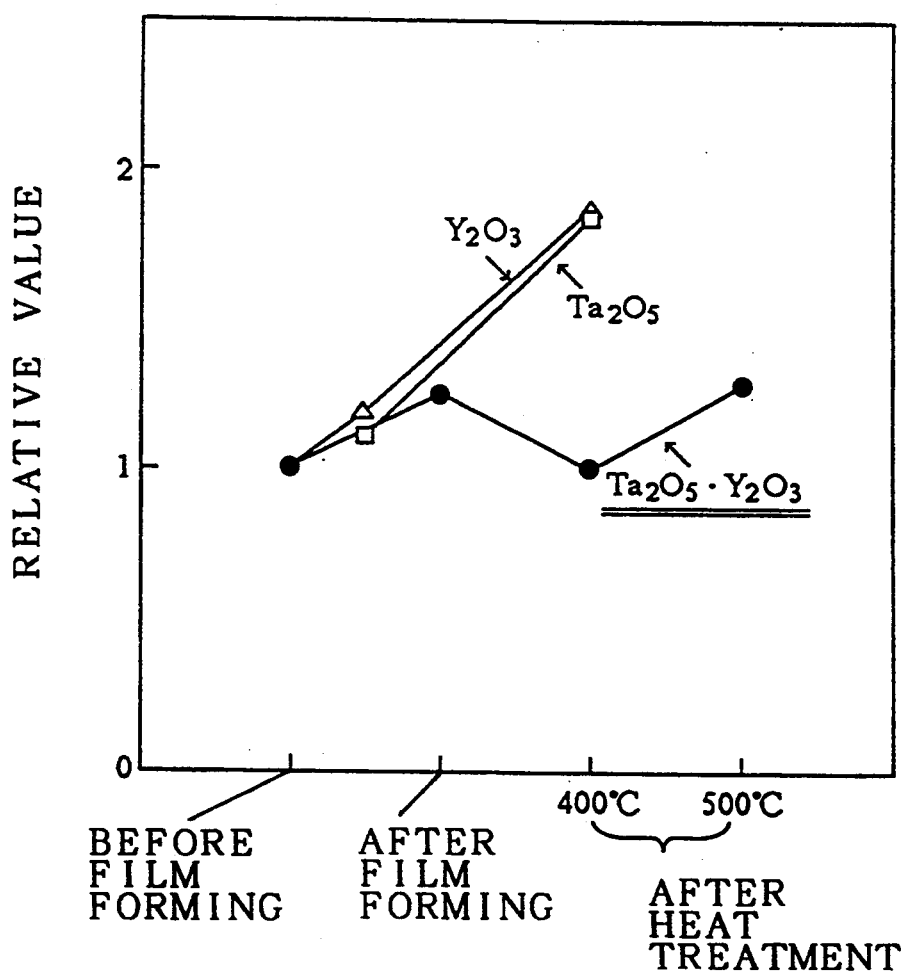
FIG. 9 is a graph illustrating the variations of the electrical resistances exhibited by an indium tin oxide (hereinafter abbreviated to "ITO") film formed on a substrate of an EL element of a preferred embodiment and substrates of EL element of a comparative example.

FIG. 9 illustrates the resistance value variations of ITO transparent electrodes 2 during the production processes of the present and the comparative EL elements. During the production processes, the present EL element hardly exhibited resistance value variation when compared with those exhibited by the comparative EL elements. It is believed that there arose stable composite oxides by adding $Y_2O_3$ into $Ta_2O_5$, and that the stable composite oxides hardly reacted with the ITO transparent electrode 2 even when the present EL element was subjected to heat treatments.

Here, let us consider the insulator film formation process. In the prior art, it is necessary to form the insulator layer, which is made of $Y_2O_3$, $SiO_2$, etc., and which exhibits the self-healing type breakdown mode characteristic, in the interface between the ITO transparent electrode layer 2 and the conventional simple $Ta_2O_5$ insulator film which exhibits propagation type breakdown mode characteristics, and accordingly the conventional insulator film formation process is complicated. However, the present EL element includes the insulator layers 3 and 5 which are made of the composite oxide insulator films, and accordingly the insulator film formation process can be simplified in the production process of the present EL element.

As has been described so far, the present EL element includes insulator layers 3 and 5 which are made of composite oxide insulator film including $Ta_2O_5$ and $Y_2O_3$, and accordingly it provides the following advantageous effects: it is improved in terms of adhesion, it is made to exhibit the self-healing type breakdown mode, and it includes the ITO transparent electrode 2 whose resistance value is hardly increased. As a result, the present EL element can be operated stably even when it is operated for a long period of time. These advantageous effects were verified as follows.

Figure 10:
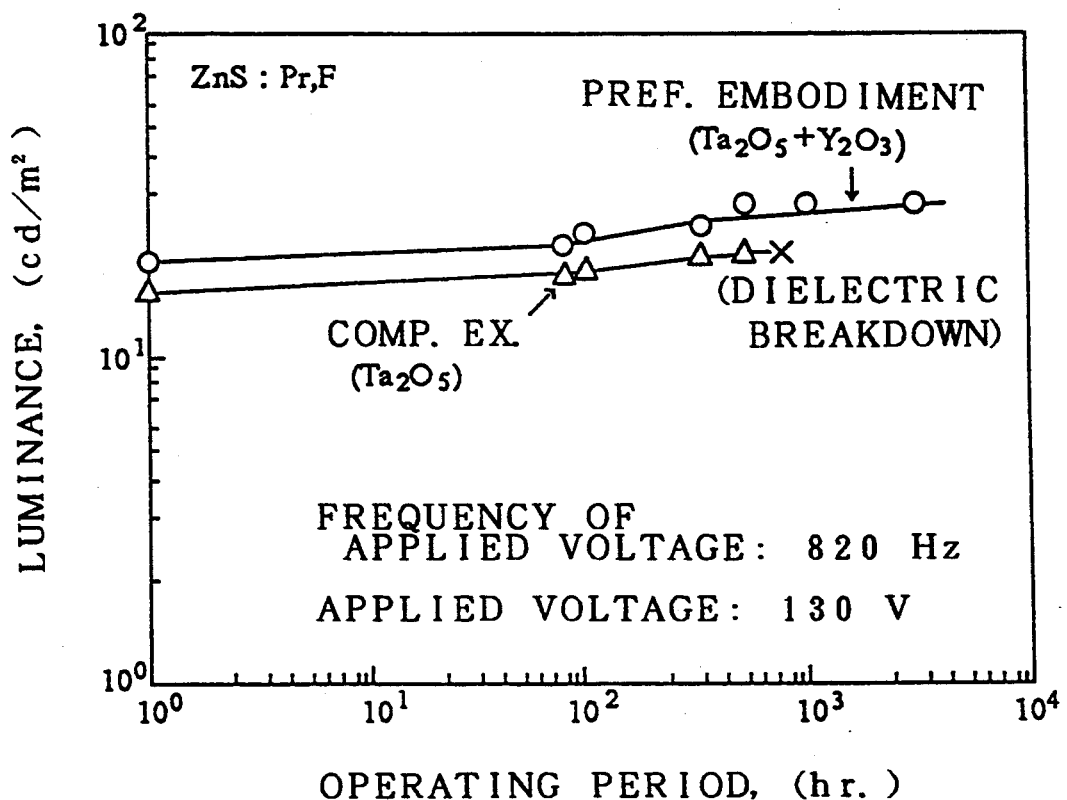
FIG. 10 is a graph illustrating the light-emitting luminance variations against the time passage when an EL element of a preferred embodiment and an EL element of a comparative example were operated continuously.

FIG. 10 illustrates the light-emitting variations of the present and the comparative EL elements with respect to the time passage. Here, the present and comparative EL elements were made to include a luminous layer 4 which contained Pr as the luminous centers, they were enclosed merely with an epoxy resin, and they were operated for a long period of time in the atmosphere. As can be seen from FIG. 10, the present thin film EL element was confirmed to operate stably for a period of 2000 hours or more, and accordingly it was superior in reliability. This advantageous effect results from the fact that the predetermined voltage was applied to the luminous layer 4 so stably that the insulator layers 3 and 5 holding the luminous layer 4 therebetween were improved in terms of stability.

Further, one of the initial characteristics of the present EL element, e.g., the light-emitting luminance-applied voltage characteristic illustrated in FIG. 8, depends on the maximum accumulable electric charges of the insulator layers 3 and 5. As can be seen from FIG. 8, the initial characteristic of the present EL element was stabilized, and its life was prolonged. This advantageous effect resulted from the construction of the present EL element. Namely, the present EL element included insulator layers 3 and 5 which satisfied the following key factors for making the present EL element stable and long lived: the adhesion between the insulator layer 3 or 5 and luminous layer 4 as well as the adhesion between the insulator layer 3 or 4 and the ITO transparent electrode 2 or the aluminum electrode 6 was improved, the overall construction was made to exhibit a self-healing type breakdown mode, and the ITO transparent electrode 2 was made to exhibit a resistance value which hardly varied.

On the other hand, although the initial characteristic was no problem in comparative EL element which included a conventional simple $Ta_2O_5$ insulator film, the comparative EL element underwent breakdown approximately 1000 hours earlier as illustrated in FIG. 10, and it had a short period of life. The following are believed to be the causes of the short life: the adhesion was inferior to those described above, the overall construction exhibited the propagation type breakdown mode, etc. Thus, the comparative EL element suffered from factors which adversely affected the reliability and the stability.

Having now fully described the present invention, it will be apparent to one of ordinary skill in the art that many changes and modifications can be made thereto without departing from the spirit or scope of the present invention as set forth herein including the appended claims.

What is claimed is:

1. A thin film electroluminescent (EL) element, comprising:
    a pair of electrodes disposed oppositely each other;
    a pair of insulator layers disposed between said electrodes, at least one of the insulator layers consisting essentially of tantalum oxide ($Ta_2O_5$) and tungsten oxide ($WO_3$), wherein tungsten is present in an amount of less than 15 atomic % with respect to the sum of tantalum and tungsten therein taken as 100 atomic %; and
    a luminous layer held between said insulator layers containing a compound including at least a combination of a group II element and a group VI element of the Periodic Table with a rare earth element added as luminous centers.

2. The thin film EL element according to claim 1, wherein at least one, of said insulator layers includes tungsten in an amount of 2 to 4 atomic % with respect to the sum of tantalum and tungsten therein taken as 100 atomic %.

3. The thin film EL element according to claim 1, wherein at least one of said insulator layers has a thickness of 0.2 to 2.0 micrometers.

4. The thin film EL element according to claim 3, wherein at least one of said insulator layers has a thickness of 0.3 to 1.0 micrometer.

5. The thin film EL element according to claim 1, wherein said luminous layer includes zinc sulfide (ZnS) doped with terbium (Tb).

6. The thin film EL element according to claim 5, wherein said luminous layer has a thickness of 0.5 to 1 micrometer.

7. The thin Film EL element according to claim 1, wherein said luminous layer includes zinc sulfide (ZnS) doped with praseodymium (Pr).

8. The thin film EL element according to claim 7, wherein said luminous layer has a thickness of 0.5 to 1 micrometer.

* * * * *